July 6, 1937. H. WESTBERG ET AL Re. 20,440

CONCRETE CONVEYING AND MIXING MACHINE

Original Filed June 8, 1932 2 Sheets-Sheet 1

INVENTORS
HARRY WESTBERG
LAWRENCE E. McCORMACK
BY James M. Abbett
ATTORNEYS.

July 6, 1937. H. WESTBERG ET AL Re. 20,440
CONCRETE CONVEYING AND MIXING MACHINE
Original Filed June 8, 1932 2 Sheets-Sheet 2
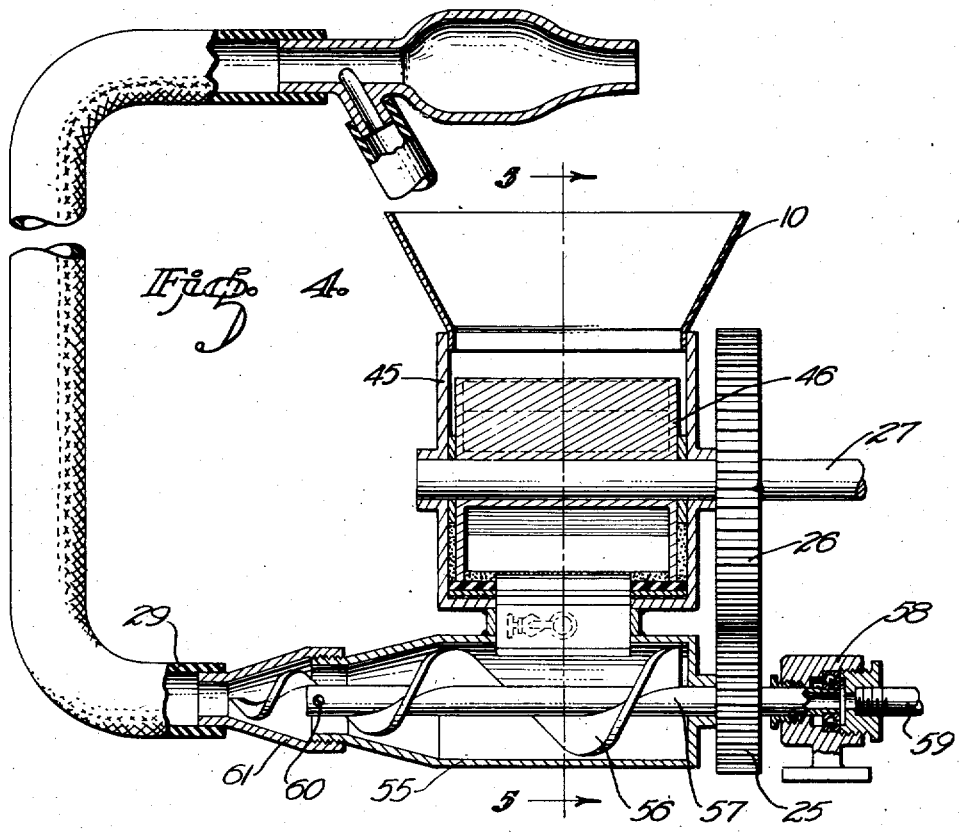
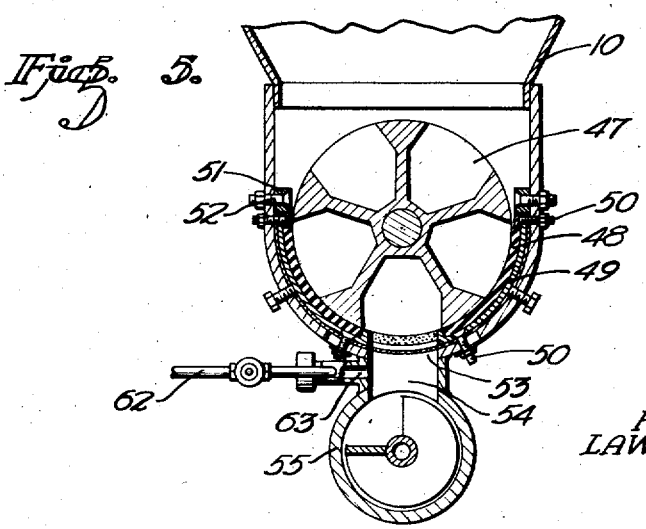
INVENTOR.
HARRY WESTBERG
LAWRENCE E. McCORMACK
BY James M. Abbett
ATTORNEYS.

Reissued July 6, 1937

Re. 20,440

UNITED STATES PATENT OFFICE 20,440

CONCRETE CONVEYING AND MIXING MACHINE

Harry Westberg and Lawrence E. McCormack, Los Angeles, Calif., assignors, by direct and mesne assignments, of one-half to Gustave Edward Westberg, Los Angeles, Calif., and one-half to Walter S. Rae, Pittsburgh, Pa.

Original No. 1,953,091, dated April 3, 1934, Serial No. 616,074, June 8, 1932. Application for reissue July 13, 1935, Serial No. 33,178

12 Claims. (Cl. 83—73)

This invention relates to a method and means for mixing and conveying plastic materials.

In connection with the construction of various structures, particularly with which the use of cementitious material is concerned; as for example, plasters, cements, and concrete, it has been found desirable to provide means for continuously mixing the ingredients of the cementitious mass for continuously and directly delivering the mixed mass to a desired point of application or deposit.

In most instances where an attempt has been made to obtain such results the materials have been pre-mixed with water. This has caused considerable trouble in the transit conduits due to clogging while the machine is in operation, and due to the complete obstruction of the conduit lines after operation, unless a great deal of care is exercised to clean the lines to prevent hardening or setting of the materials.

Broadly considered, the present invention is concerned with a method of, and means for, conveying comminuted particles to a remote point by dispersing said particles within a fluid, such as air, within which and by the action of which fluid and suitably acting mechanical means the material is conveyed to a desired remote point.

The present invention is specifically characterized by providing a method and means for mixing the ingredients of a cementitious mass while in a substantially dry state, dispersing the particles within a fluid medium such as air, and thereafter conveying the mixed materials to an outlet nozzle by mechanical and pneumatic force and suspending action, and then properly and intimately mixing the ingredient particles with water just prior to their discharge from the conveying conduit, and as the particles of wet plastic material are projected upon the surface to be coated or directed into a suitable form or container.

The present invention contemplates the provision of a mixing hopper into which desired and controlled proportions of relatively dry ingredients may be placed and from which these mixed ingredients may be withdrawn in metered quantities, said mixing, metering device being disposed adjacent to a mechanical conveyor by which the dry materials will be agitated and impelled into a conveying conduit. Interposed between the metering device and the mechanical conveyor is a chamber or dome into which air is delivered under pressure, said air acting to mechanically agitate, disperse and suspend the particles of material and to carry it forwardly through the apparatus. The mechanical impelling action of the conveyor is also assisted by the force of air under pressure passing through the conduit and within which the particles are mechanically suspended. The discharge end of the conduit is provided with a discharge nozzle within which is incorporated means for insuring that water and the dispersed dry ingredients will commingle and adequately mix as they travel through the nozzle to thoroughly hydrate the particles and will be projected therefrom in a plastic mass of desired consistency and hydration.

The invention is illustrated by way of example in the accompanying drawings, in which:—

Fig. 4 is a view in longitudinal section showing another form of construction of our invention.

Fig. 5 is a view in transverse section through the form of the device indicated in Fig. 4 as seen on the line 5—5 of Fig. 4.

Figure 1:
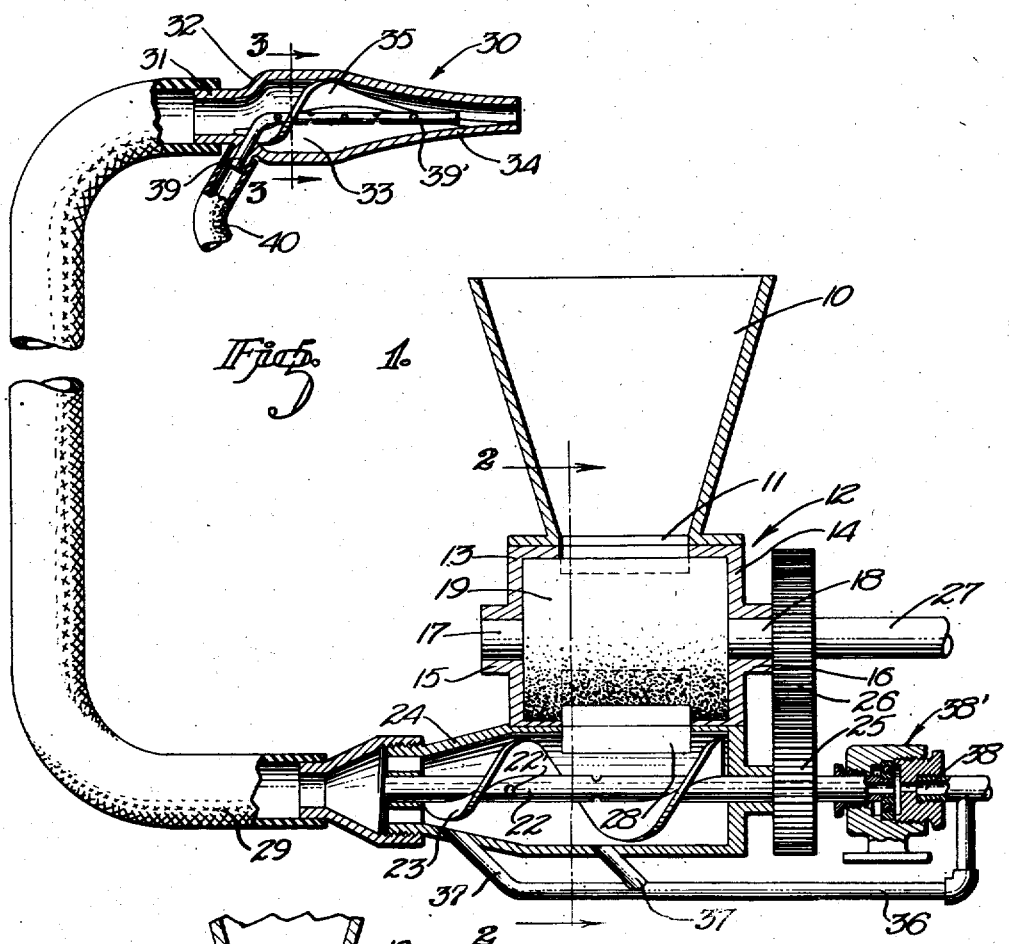
Figure 1 is a view in central vertical section and elevation through the conveying and mixing device with which the present invention is concerned.
Figure 2:
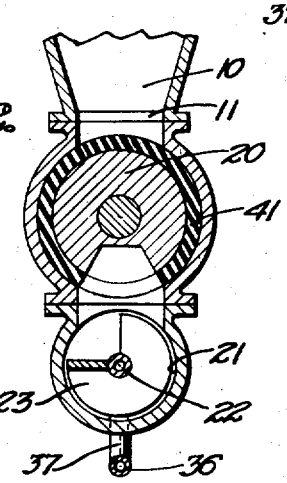
Fig. 2 is a view in transverse central section through the device as seen on the line 2—2 of Fig. 1.
Figure 3:
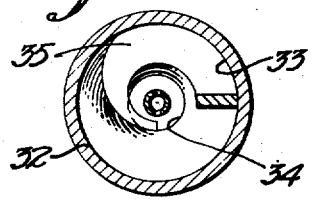
Fig. 3 is an enlarged view in transverse section through the nozzle as seen on the line 3—3 of Fig. 1 and particularly showing the construction of the mixing chamber of the nozzle.

Referring more particularly to the form of the invention shown in Figures 1 to 3, inclusive, of the drawings, 10 indicates a hopper through which measured quantities of various ingredients are disposed, such as plaster and sand used in making wall plaster or mortar or sand, gravel and cement used in making concrete. The hopper may be of any desired capacity and is preferably formed with inwardly converging side walls surrounding a restricted throat 11 at its bottom. Disposed transversely of the lower end of the hopper is a cylindrical housing 12 into which the hopper fits. This housing is formed with opposite ends 13 and 14 which carry bearings 15 and 16. The trunnions 17 and 18 of a meter valve 19 extend through these bearings and are fastened to the opposite closed ends of the valve 19. As shown in Figure 2 of the drawings, the meter valve is cylindrical and is formed with a pocket 20 in its circumferential face, and which pocket has an outer opened end agreeing in dimensions and contour with the opening throat 11 at the bottom of the hopper. It will thus be evident that as the valve 19 rotates to dispose the pocket 20 in register with the throat 11, a quantity of the dry mixed materials will fall into the pocket 20 and fill the same as the valve rotates. When the valve has rotated to dispose the pocket 20 in a position diametrically opposite from the mouth of the hopper, the material will be dropped into a feed chamber 21. A drive shaft 22 extends through the feed chamber and carries a screw conveyor blade 23. This blade is reduced in diameter at its outer end and projects through a tapered tubular outlet 24 in communication with the end of the chamber 21. The shaft 22 is provided with a gear 25 which is in mesh with a gear 26 carried upon the trunnion 18. The gear 26 is also keyed to a drive shaft 27 which may be driven by any suitable source of supply. The ratio of the gears 25 and 26 with relation to each other is such that the shaft 22 and its conveyer blade will be driven at a desired rate of speed with relation to the speed of rotation of the valve 19 so that the material may be forced from the chamber 21 when the valve 19 has rotated to close opening 28 in the wall of the chamber 21 and between it and the housing 12 which encloses the valve. Secured at the outer restricted end of the tubular member 24 is a conduit 29. This may be a rigid pipe or a flexible hose, as shown in the drawings. The outer end of this conduit is fitted with a nozzle structure 30 which has a cylindrical portion 31 to which the conduit 29 is secured. The cylinder 31 is enlarged as indicated at 32 to provide a mixing chamber 33 through which the material is forced and from which it passes into a tapered tubular nozzle portion 34. Mounted within the mixing chamber 33 of the nozzle is a spiral blade 35 extending forwardly and outwardly into the nozzle portion 34. This blade will act to impart gyratory movement to the material being forced through the nozzle. It will be evident that considerable mechanical force and agitation will be imparted to the granular material as it is fed into the tapered tubular portion 24 and thence into the nozzle. This force will be obtained by the action of the screw conveyer blade 35. Additional force is obtained by the action of air delivered from a suitable source of supply through a pipe 36 and projected into the chamber 21 and the tubular extension 24 by inclined nozzles 37. It may also be desirable to deliver air to and through the screw shaft 22 from the pipe 38 through packing 38' to outlet openings 22'.

In the cylindrical portion 31 of the nozzle is a water connection 39 to which a conduit 40 may be secured and by which water may be delivered through the base of the nozzle to mix with the dry material being fed into the nozzle. The connection 39 extends longitudinally within the nozzle and is formed with perforations 39' through which water may be fed to the materials passing through the nozzle. The force of movement of the material is such as to cause the water and material to enter the mixing chamber 33 with considerable violence. This will be increased due to the relatively large diameter of the mixing chamber into which the material under pressure is released and within which the material is violently agitated.

In operation of the present invention, as shown in Figs. 1 to 3, inclusive, the desired ingredients for a cementitious product may be placed in the hopper 10 in a relatively dry condition and in suitable proportions. As the valve 19 continues to rotate under the driving action of the source of motive power delivered through the shaft 27, the pocket 20 will move to register with the throat 11 and as the pocket moves into and out of register the pocket will be filled with the mixed dry materials and will be carried around to the discharge opening 28 where it will be dropped into the feed chamber 21.

In order to maintain a tight joint between the cylindrical outer surface of the valve 19 and the housing 12, it may be desirable to form the bearings 15 and 16 separately from the ends 13 and 14 of the housing so that bearings may be adjusted to move the valve to a seated position.

It may also be desirable to cover the valve with a coating of rubber or other material such as indicated at 41 in Fig. 2 of the drawings.

When the dry material is dropped into the chamber 21, the blade 23 will force the material endwise, since shaft 22 is being constantly driven through gears 25 and 26 from the drive shaft 27. The force imparted to the moving material will be progressively increased as the material is forced into the tubular throat 24 and from the restricted end thereof into the conduit 29. During this time the material will be to an extent agitated and suspended by the air under pressure projected into the mass of material through the nozzles 37 and openings 22', and will be forced through the conduit 29 due to the pneumatic pressure and also the fact that the material may be carried in suspension in the air passing through the conduit. When the material reaches the end of the conduit 29, water is continuously introduced through the hose 40 and the connection 39, and the plastic mass is then forced through the relatively small opening of the cylindrical base 31 into the larger area of the mixing chamber 33. The action of the spiral blade 35 and the release of the pressure as the material passes from the restricted throat of member 31 and enters the larger area 33, will tend to reduce the velocity of the material and cause it to swirl around within the mixing chamber 33 to be agitated and given a gyratory movement as it moves longitudinally into the tubular outlet 34 of the nozzle from which it will be projected with considerable force in a suitable stream or jet; the material then having a desired water content and having been thoroughly mixed ready for use. The force of the jet may be sufficient to cause the stream to be projected into forms normally inaccessible and out of the way, or it may be used to permit manipulation of the nozzle so that plastic material may be directly applied to a surface to be covered. In this event attention is directed to the fact that the force of impact of the material with the surface to be covered will tend to compact the plastic material and to insure that the final set product will be of desired hardness and texture.

In the form of the invention shown in Figs. 4 and 5 of the drawings various changes and modifications have been made as compared with the structure shown in Figs. 1 to 3 inclusive.

In this type of the device the hopper 10 communicates directly with an open housing 45 through which the material to be conveyed is delivered, and within which housing a rotary valve 46 is mounted. This valve is different from the valve 19 previously described in that it is formed with a plurality of measuring pockets 47 which receive the loose material deposited upon the rotary valve and which material falls into the pockets as the valve rotates within the open housing 45. The pockets are sealed along the lower half of the circumference of the valve by an arcuate rubber sealing strip 48 which is mounted upon a resilient packing strip 49 which is held in position by bolts 50 which pass through the wall of the housing 45. It will be seen by reference to Fig. 5 of the drawings, that the lower portion of the housing 45 is arcuate and that it conforms to the general contour of the cylindrical valve member 46. The packing member 49 is preferably formed of sheet spring steel so that it may be adjustably positioned with relation to the surface of the valve member 46 by the adjusting screws or bolts 50. A metal guard strip 51 is secured at the upper edge of the packing strip 49 upon diametrically opposite sides of the valve. This strip is held in position by bolts 52. Directly in the bottom of the housing 45 is an outlet opening 53 which is of substantially the same area and configuration as that of the mouth of the pockets 47 in the valve 46.

It will be evident that when a pocket assumes an inverted position at the lowermost point in its travel it will discharge the material therein, permitting it to fall through a throat 54 into the housing 55. This housing is cylindrical, having an axis parallel to the rotating axis of the valve 46 and into which housing the material is delivered and from which it is forced by mechanical and pneumatic action.

A spiral agitating screw 56 is mounted within the housing 55 upon a shaft 57. This screw is reduced in diameter towards its forward end and in this reduction of diameter agreeing with a similar reduction of diameter of the end of the housing 55. The shaft 57 is tubular, communicating at one end with a packing structure 58 and a pneumatic supply pipe 59. Adjacent the opposite end of the shaft 57 is a plurality of outlet openings 60 from which the air may pass and will produce a pneumatic action, tending to eject the material and to force it into the restricted throat 61, as well as agitate the material and maintain the restricted throat 61 open. This throat communicates with the delivery hose 29 previously described.

In addition to the supply of air through the shaft 57 there is a supply of air into the throat 54 which occurs between the valve housing 45 and the screw housing 55. This causes the complete quantity of material falling into the member 55 to be subjected to pneumatic pressure and at the same time tends to agitate the material within the hopper so that it will be more thoroughly mixed and so that there will be greater possibility that the pockets will be filled and that they will not clog during operation. This supply of air is delivered from a supply pipe 62 to a relatively large induction pipe 63 or dome communicating with the throat 54 through the side wall thereof.

Attention is directed to the fact that the pipe 62 is shown as introducing the air into the dome 63 in a direction at right angles to the longitudinal axis of the dome 63. The air passing from the dome into the throat 54 will in turn be projected transversely of the vertical path of travel of the measured quantities of material which fall from a pocket of the valve and pass by gravity through the throat. The air passing into this throat from the dome will create turbulence so that the amounts of falling material will be dispersed throughout the volume of incoming air, and will thereby be, to an extent, agitated and uniformly suspended in the fluid medium as it is carried downwardly, and thence forwardly through the housing and along and around the feed screw in its suspended and dispersed condition.

In operation of the form of invention shown in Figs. 4 and 5 it will be evident that the hopper 10 may be filled to any desired amount and it is preferable to completely cover the rotary valve 46. This valve will be driven through shaft 27 and as the valve rotates the pockets 47 will be filled successively with the material and moved to a position where they will deliver the material to the throat 54 and thereafter into the lower housing 55. At the same time the shaft 57 will be driven through the gears 26 and 25, and this shaft will act through its screw propeller 56 to force the material endwise and to cause it to move through the throat 61 into the hose 29.

Attention is directed to the fact that the throat 54 provides an unrestricted passageway for the downwardly moving material and air, and that the successive batches of material will encounter the screw conveyor when passing into lower housing 55 and by which member the materials will be thoroughly disseminated within the associated air so that the mixture of materials and air will be uniform and continuous during its subsequent travel through the apparatus. During all this time air is being delivered under pressure through the pipe 62 to the throat 54 where it will produce a uniform pressure and agitating action upon the material entering the housing 55. An additional supply of air will be ejected radially and in a direction longitudinally of the shaft 57 through the opening 60 adjacent the discharge throat 61. In this manner the mechanical feed of the screw will be assisted by a pneumatic medium which will act to agitate and disperse the material as well as to suspend and force it along its path of travel. This arrangement insures that the air entering the throat 54 under pressure will tend to create a pneumatic action upon the entire mass of falling particles of material, thoroughly agitating and aerating the same, and thereby create turbulence in the mass of falling material which will disseminate and mechanically suspend the material particles within the fluid medium as they are carried forwardly from the zone of turbulence through the machine and to the discharge nozzle. It will thus be evident that by the method here shown in which measured quantities of comminuted materials are successively introduced into a zone of fluid turbulence, and are thereafter carried forwardly with the fluid as it travels downwardly through the throat from the valve, and thence successively through the feed screw housing and the conduit, that the material will be in a thorough condition of aeration and dispersion when it reaches the discharge nozzle, and that the solid particles will at that point be separated and to be more uniformly wetted to produce a most desirable plastic mass. It has been found that by aerating and hydrating the particles of a cementitious mass, as here shown, that the method may be continuously practiced, and that the final product obtained thereby will have a high degree of uniform structural strength.

It has also been noted that the mass of material in the hopper 10 and the housing 45 will pulsate at each time a pocket passes to a point to contact with the sealing and packing member 48. This is due to the fact that compressed air will be locked in each of the pockets and will be released when the pockets move to a position within the hopper. This released air will find its way upwardly through the mass of material in the hopper and will tend to agitate and settle it.

It will thus be seen that the structures here disclosed provide means for conveniently metering and conveying dry cementitious products and to thereafter directly apply or dispose these products as desired while the product is in a plastic or semi-plastic state.

While we have shown the preferred form of our invention as now known to us, it will be understood that various changes may be made in combination, construction, and arrangement of parts by those skilled in the art without departing from the spirit of our invention as claimed, and it is to be understood that while we have described our invention as being applicable for use with various cementitious materials, it is within the scope of the invention to use the device for the mixing and/or conveying of any materials which could be moved through a conduit such; for example, as liquids, dry materials, or plastic material of whatsoever nature.

Having thus described my invention what I claim and desire to secure by Letters Patent is:

1. A mixing and conveying device comprising a hopper into which ingredients are placed, a valve at the bottom of the hopper acting to withdraw successively measured quantities of the mixed ingredients from the hopper, mechanical feed means to which said measured quantities of ingredients are delivered, means introducing a fluid under pressure to the device at a point between said valve and the mechanical feed means, a conduit through which the ingredients are forced by said mechanical feed means and said fluid, a nozzle in the end of said conduit, means for supplying the water to said nozzle and means for mixing said ingredients with the water as they are forced from the nozzle.

2. A mixing and conveying device comprising a hopper into which ingredients are placed, a valve at the bottom of the hopper acting to withdraw successively measured quantities of the mixed ingredients from the hopper, mechanical feed means to which said measured quantities of ingredients are delivered, means introducing a fluid under pressure to the device at a point between said valve and the mechanical feed means, a conduit through which the ingredients are forced by said mechanical feed means and said fluid, a nozzle in the end of said conduit, means for supplying the water to said nozzle, means for mixing said ingredients with the water as they are forced from the nozzle, and pneumatic means aiding the mechanical means in conveying the material through the conduit.

3. A mixing and conveying device comprising a hopper into which measured quantities of ingredients are placed in a relatively dry state, a mechanical valve at the discharge end of said hopper for withdrawing measured quantities of the mixed ingredients therefrom, a feed chamber through which said ingredients are discharged by the valve, a conduit connected to the feed chamber, a feed screw within the feed chamber acting to force the mixed ingredients from the feed chamber and through the conduit, pneumatic means within the feed chamber at a point between the valve and the feed screw for assisting the feed screw in conveying the material through the conduit, the valve beneath the hopper acting at all times to provide a pneumatic seal between the feed chamber and the hopper and a nozzle from which the mixed materials are projected.

4. A conveying device comprising a feed hopper into which comminuted material may be placed, a draw-off throat at the bottom thereof, a rotary valve normally closing said draw-off throat, the valve being formed with a pocket in its circumferential face to receive material from the hopper and to discharge it through said throat, a feed screw housing disposed beneath said hopper and communicating with said throat, a conduit communicating with one end of said housing, a feed screw within the housing to force material into and through the conduit, and means creating pneumatic pressure within the throat and between the rotary valve and the feed screw housing whereby material delivered from the rotary valve to the feed screw will be acted upon by pneumatic pressure tending to force it along the feed screw and through the conduit.

5. A mixing and conveying device comprising a hopper into which finely divided material may be placed, an outlet opening at the bottom of said hopper, a pressure chamber below the hopper and with which said outlet opening communicates, a rotary valve within the hopper for closing the outlet opening, said valve being formed with a plurality of pockets in its circumferential face to receive material from the hopper and to discharge it through the outlet opening at the bottom thereof, a feed screw housing below the pressure chamber and in communication therewith to receive the material discharged from the hopper and from a pocket of said rotary valve, means delivering air under pressure to said pressure chamber to create pneumatic pressure upon the quantity of material feeding into the feed screw housing, a feed screw within said housing to move the material longitudinally thereof, and a conduit through which said material is forced by the mechanical action of the feed screw and the pneumatic action of air delivered to the pressure chamber.

6. A mixing and conveying device comprising a hopper into which finely divided material may be placed, an outlet opening at the bottom of said hopper, a pressure chamber below the hopper and with which said outlet opening communicates, a rotary valve within the hopper for closing the outlet opening, said valve being formed with a plurality of pockets in its circumferential face to receive material from the hopper and to discharge it through the outlet opening at the bottom thereof, a feed screw housing below the pressure chamber and in communication therewith to receive the material discharged from the hopper and from a pocket of said rotary valve, means delivering air under pressure to said pressure chamber to create pneumatic pressure upon the quantity of material feeding into the feed screw housing, a feed screw within said housing to move the material longitudinally thereof, a conduit through which said material is forced by the mechanical action of the feed screw and the pneumatic action of the air delivered to the pressure chamber, and means delivering air to the conduit as the feed screw feeds material thereinto to aid in conveying the same.

7. A mixing and conveying device comprising a feed hopper into which finely divided material may be placed, a rotary valve at the bottom of said hopper and formed with a plurality of pockets in its circumferential face and into which pockets said material may fall, an outlet opening in the bottom of the hopper and constantly closed by the valve, said outlet opening substantially agreeing in area with the opening area of a pocket, a pressure chamber leading from said outlet opening and being of an area substantially equal thereto, a cylindrical feed screw housing beneath the pressure chamber and in communication therewith and into which the quantities of material from the pockets may be successively fed, a conveying screw of an outside diameter substantially equal to that of its housing and extending longitudinally thereof, a conduit in communication with one end thereof, and means for creating air pressure within the pressure chamber and above the material delivered to the conveyor housing whereby said pressure will combine with the mechanical feeding action of the screw conveyor to feed the material therefrom.

8. A mixing and conveying device for finely divided materials comprising a hopper into which the materials may be placed, a rotary valve at the bottom of the hopper and on which the mass of material rests, pockets formed in the circumferential face of said rotary valve to receive quantities of said material, an opening in the bottom of said hopper constantly sealed off from the hopper by the rotary valve, said opening being substantially of the same width as the width of the pockets in the valve, a downwardly extending pressure chamber with which said opening communicates, means for supplying fluid under pressure to said chamber, a screw conveyor housing of greater capacity than the volume of material fed from one of the pockets in the valve through the pressure chamber, said housing communicating with the hopper through said pressure chamber, the screw conveyor housing being formed at one end with a restricted outlet passageway, a screw conveyor within the housing adapted to receive the quantities of material successively delivered from the rotary valve and moving them toward the restricted end of the housing, and a conduit communicating with said restricted end of the housing and through which said material is forced by the combined action of the screw conveyor and the pneumatic pressure derived from the pressure chamber.

9. A mixing and conveying device for finely divided materials comprising a hopper, a cylindrical rotary valve at the bottom of the hopper and of a diameter substantially equal to the width of the hopper and a length substantially equal to the length of the hopper whereby the valve will form a floor for the hopper, pockets formed in the circumferential face of said rotary valve and extending longitudinally thereof to receive a quantity of material with which the hopper is filled, an outlet opening at the bottom of the hopper and of a size and configuration agreeing with the mouth of one of the pockets in the rotary valve whereby the contents from one of said pockets may be discharged from the hopper through said opening when a pocket is in register therewith, a pressure chamber beneath the hopper and into which the material is discharged through said opening, means interposed between the wall of the hopper and said rotary valve to create an air-tight seal between the pressure chamber and the hopper, a screw conveyor housing to which the material is delivered from the pressure of the chamber, a conveyor screw therein adapted to force the material from one end of the housing, and means for delivering air under pressure to the pressure chamber whereby the successive batches of material successively fed to the screw conveyor from the hopper will be forced from the conveyor housing by pneumatic and mechanical action.

10. A conveying device comprising a hopper into which comminuted materials are placed, a throat in connection with said hopper, a valve for withdrawing material from the hopper in a metered flow and delivering the same into said eduction throat, a feed housing with which said throat communicates, the throat having a relationship between the valve and the feed housing to permit the materials to fall directly from the valve to the feed housing, pneumatic means for creating a zone of turbulence within said throat and with the air moving in a general direction transversely of the path of the falling materials whereby dispersion and mechanical suspension of the particles of falling materials may be brought about as the air and materials pass downwardly into said feed housing, mechanical feed means acting to move the air and material particles transversely of its path of travel from the throat, the housing being formed with an outlet in the path of the materials and air moving therethrough, and a conduit in communication therewith and into which and along which said air and associated particles will be forced to travel by the movement of the air and the action of the mechanical feed.

11. A mixing and conveying device comprising a hopper into which comminuted materials are placed, a throat in connection with said hopper, a valve for withdrawing material from the hopper in a metered flow and delivering the same into said eduction throat, a feed housing with which said throat communicates, the throat having a relationship between the valve and the feed housing to permit the materials to fall directly from the valve to the feed housing, pneumatic means for creating a zone of turbulence within said throat and with the air moving in a general direction transversely of the path of the falling materials whereby dispersion and mechanical suspension of the particles of falling materials may be brought about as the air and materials pass downwardly into said feed housing, mechanical feed means acting to move the air and material particles transversely of its path of travel from the throat, the housing being formed with an outlet in the path of the materials and air moving therethrough, and a conduit in communication therewith and into which and along which said air and associated particles will be forced to travel by the movement of the air and the action of the mechanical feed, a discharge nozzle at the eduction end of said conduit through which the air and the materials in the condition of dispersion pass, and means for hydrating said dispersed particles as they pass through the nozzle and outwardly therefrom.

12. A conveying device comprising a hopper into which comminuted materials are placed, a throat beneath said hopper, a valve interposed between the throat and the hopper for delivering materials from the hopper to the throat in a metered flow, a feed housing disposed beneath said throat, pneumatic means for creating a zone of turbulence within the throat and with air moving in a general direction transversely of the path of falling materials whereby the finely divided material falling freely from the valve through the passageway will be disbursed and placed in suspension within the air which flows from the passageway to the feed housing, mechanical means disposed within said feed housing and acting to feed the air and suspended material forwardly while limiting the flow of air to maintain a desired pressure within the feed throat, synchronous driving means for the material valve and last named mechanical means, and a conduit communicating with said feed housing and through which the suspended materials and air may flow from the feed housing.

HARRY WESTBERG.
LAWRENCE E. McCORMACK.